United States Patent [19]
McBranch et al.

[11] Patent Number: 5,741,442
[45] Date of Patent: Apr. 21, 1998

[54] OPTICAL LIMITING MATERIALS

[75] Inventors: Duncan W. McBranch; Benjamin R. Mattes, both of Santa Fe; Aaron C. Koskelo, Los Alamos, all of N. Mex.; Alan J. Heeger, Santa Barbara, Calif.; Jeanne M. Robinson, Los Alamos, N. Mex.; Laura B. Smilowitz, Los Alamos, N. Mex.; Victor I. Klimov, Los Alamos, N. Mex.; Myoungsik Cha, Goleta; N. Serdar Sariciftci, Santa Barbara, both of Calif.; Jan C. Hummelen, Groningen, Netherlands

[73] Assignee: The Regents of the University of California, Los Alamos, Minn.

[21] Appl. No.: 499,888

[22] Filed: Jul. 11, 1995

[51] Int. Cl.$^6$ .................... F21V 9/00; G02B 5/22
[52] U.S. Cl. ........................... 252/582; 359/885
[58] Field of Search ..................... 252/582; 359/885

[56] References Cited

U.S. PATENT DOCUMENTS 5,172,278  12/1992  Tutt ................................. 359/885
5,364,993  11/1994  Zhang et al. ..................... 570/187
5,391,329   2/1995  Dougherty et al. .............. 359/885
5,420,081   5/1995  Mattes et al. ..................... 501/12

OTHER PUBLICATIONS

Cha et al., Chemical Abstract 124:70848K, Abstract of Appl. Phys. Lett., (1995), 67(26), pp. 3850–3852.

*Primary Examiner*—Philip Tucker
*Attorney, Agent, or Firm*—Samuel M. Freund

[57] ABSTRACT

Optical limiting materials. Methanofullerenes, fulleroids and/or other fullerenes chemically altered for enhanced solubility, in liquid solution, and in solid blends with transparent glass ($SiO_2$) gels or polymers, or semiconducting (conjugated) polymers, are shown to be useful as optical limiters (optical surge protectors). The nonlinear absorption is tunable such that the energy transmitted through such blends saturates at high input energy per pulse over a wide range of wavelengths from 400–1100 nm by selecting the host material for its absorption wavelength and ability to transfer the absorbed energy into the optical limiting composition dissolved therein. This phenomenon should be generalizable to other compositions than substituted fullerenes.

7 Claims, 4 Drawing Sheets

OPTICAL LIMITING MATERIALS

The invention was made with government support under Contract No. W-7405-ENG-36 awarded by the U.S. Department of Energy to the Regents of the University of California and under AFOSR-93-1-0191DEF between the Department of Defense and the Regents of the University of California. The government has certain rights in the invention.

FIELD OF THE INVENTION

The present invention relates generally to optical limiting materials and more particularly to the use of derivatives of buckminstedullerene ($C_{60}$), to which side groups are attached for the purpose of improving solubility, for nonlinear optical applications such as optical limiting, in solution, dispersed in silicon dioxide ($SiO_2$) or transparent polymer matrices, and in thin solid films of semiconducting (conjugated) polymer hosts. This latter group of hosts permits optical limiting to occur at wavelengths where the substituted fullerenes or other optical limiting materials do not have significant absorption, but the host does.

BACKGROUND OF THE INVENTION

High power lasers emit intense beams of infrared, visible or ultraviolet light having sufficient power to cause eye damage or damage to sensitive optoelectronic detectors. Therefore, there is a need for optical limiting materials. Many high power lasers are operated in a pulsed mode. Thus, to be effective as an optical limiter, the optical limiting response of a material must occur within the time duration of the pulse (the pulse width) of the emitted radiation. Laser pulse widths vary from subbicosecond ($\leq 10^{-12}$ s) to many nanoseconds ($\geq 10^{-9}$ s) or greater. If the nonlinear absorption of the material is such that the laser fluence or energy per pulse transmitted through the material saturates as a function of increased energy per laser pulse, such films function as optical limiters.

The energy per pulse (the time integral of the intensity in units of micro-Joules ($\mu J$) per pulse) transmitted through such a nonlinear medium is determined by the nonlinear absorption coefficient in units of $cm^{-1}$:

$\alpha(I)=\alpha_o+\beta_{\mathit{eff}} I$, where $I=I(r,z,t)$ is the intensity of the laser pulse at time t and coordinate (r,z) inside the medium. If the nonlinear absorption is large enough (i.e., if $\beta_{\mathit{eff}}$ is sufficiently large), such nonlinear absorption can limit the energy per pulse transmitted through the nonlinear material. In the situation where the mechanism for the nonlinear absorption is excited-state absorption, $\beta_{\mathit{eff}}$ can be simply related to the ground-state and excited-state absorption cross sections ($\sigma_0$ and $\sigma_1$, respectively, in units of $cm^2$): $\beta_{\mathit{eff}}=\eta^*\sigma_0 \, ^*\sigma_1^*\eta^*\tau/h\omega$, where $\eta$ is the concentration of molecules, $\tau$ is the laser pulsewidth, and $h\omega/2\pi$ is the photon energy at the wavelength of interest. This expression is quantitatively correct only for optical pulses which are short compared to the material relaxation times (Note also that $\alpha=\sigma\eta$). A measure of the efficacy of a given material for optical limiting is then given by $\sigma_1/\sigma_0$. That is, in order to observe optical limiting, $\sigma_1/\sigma_0 \geq 1$. For longer times, other excited states must be included; however, the criterion for optical limiting remains the same: the ratio of the excited-state absorption cross section to the ground-state absorption cross section must be greater than one [See, e.g., L. W. Tutt and T. F. Boggess, Prog. Quant. Elect. 17, 299 (1993)]. It should be mentioned that the ground-state absorption cross section must be finite in order to access the strong excited-state absorptions.

There are few nonlinear absorbing materials suitable for use as optical limiters. Materials containing buckminsterfullerene, $C_{60}$, are known as optical limiters. The limiting effect in $C_{60}$ arises from two factors: first, the ground-state absorption cross section is small but finite for wavelengths from 425–650 nm because the optical transition at these wavelengths is symmetry forbidden; and second, the excited-state absorption cross section is very large for wavelengths from 450–1100 nm, both at short times (<1 ns, due to a singlet excited state) and at longer times (1 ns-200 ms, due to a triplet excited state) [See, Tutt et al. (1993), supra.]. Hence, the ratio of the excited-state absorption cross section to the ground-state absorption cross section is much greater than one over a range of times from less than one ps to greater than 100 µs. As a result of these factors, $C_{60}$ in liquid solution serves as an effective optical limiter for wavelengths from approximately 450–650 nm; at 532 nm, the transmitted intensity is limited to intensities less than 0.15 $J/cm^2$ for laser input intensities up to 1.5 $J/cm^2$ [See, e.g., L. W. Tutt, and A. Kost, Nature 356, 225 (1992)].

Although materials containing $C_{60}$ are known as optical limiters, most were in the form of liquid solutions [See Tutt et al. (1992), supra]. However, solutions are not satisfactory for most applications; thin films applied to glasses, goggles, windows and the like are the preferred form for optical limiters. Optical limiting has been reported for $C_{60}$ in polymethyl methacrylate when pumped at 532 nm [See, e.g., A. Kost, L. Tutt, M. B. Klein, T. K. Dougherty, W. E. Elias, Opt. Lett. 18; 334 (1993)]. In this case, however, multiple thick layers were required, each layer being several millimeters in thickness. The primary obstacles to using unsubstituted fullerenes for optical limiting applications are their limited solubility, their environmental instability under ambient conditions, and the fact that the neat materials (single crystals or thin films) have drastically reduced limiting efficiency. Consequently, useful materials containing fullerenes for optical limiting must take the form of blends of the fullerenes with a suitable host material, such blends having the property that the fullerene molecules must be separated from each other by distances which are large compared with the size of the molecules; that is, no cluster formation. Since environmental factors are known to cause chemical modification of the fullerenes that affect their important electronic and optical properties, the host must also protect the $C_{60}$ and derivatives thereof, in order to preserve their unique electrooptical properties in device applications.

Figure 1:
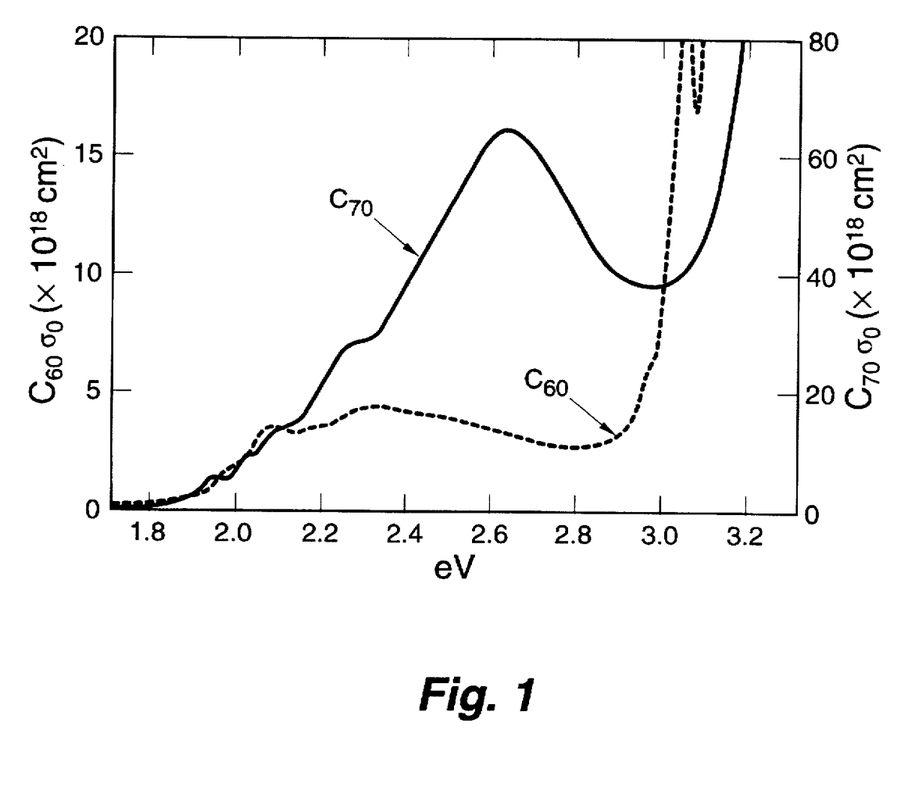
FIG. 1 shows a comparison of the ground-state absorption cross sections for $C_{60}$ (left axis, dotted line) and $C_{70}$ (right axis, solid line).

Buckminsterfullerenes may be chemically altered to attach large sidechains which render the substituted fullerene more than ten times more soluble than the pure materials in common organic solvents, as will be described more fully hereinbelow. However, the optical properties of such materials have not been investigated. The large and useful nonlinear optical properties of unsubstituted fullerenes derive from the highly symmetric structure of these molecules and the extended network of π-electrons which are distributed over the spherical surface. It would not be expected that derivatives of $C_{60}$ would have optical limiting properties greater than those for $C_{60}$. An example of a situation where the optical limiting properties of a fullerene are significantly deteriorated by changing the symmetry of the molecule from spherical to nonspherical symmetry is illustrated in FIG. 1 hereof, where the ground-state absorption cross section for $C_{60}$ is compared with that for $C_{70}$ for optical transitions between 650 and 450 nm (1.9–2.9 eV). It is apparent that the ground-state transitions for $C_{70}$ are much more strongly allowed than those for $C_{60}$.

In U.S. Pat. No. 5,420,081 for "Preparation of Fullerene/Glass Composites," which issued to Benjamin R. Mattes et al. on May 30, 1995, a technique is described whereby $C_{60}$ compounds may be imbedded in silicon dioxide ($SiO_2$) glasses using sol-gel chemistry. However, there is no discussion therein concerning the use of substituted fullerenes for optical limiting materials.

Accordingly, it is an object of the present invention to prepare optical limiting compositions using substituted fullerenes having greater solubility in host species than that for unsubstituted fullerenes therein.

It is another object of the present invention to prepare optical limiting compositions using substituted fullerenes having greater solubility in host species than that for unsubstituted fullerenes, such that the wavelength range for optical limiting of the resulting solid material is chosen by selecting the host material.

It is yet another object of the present invention to prepare optical limiting compositions using compounds known to have optical limiting properties in solution, such that the wavelength range of optical limiting of the resulting solid material may be chosen by selecting the host material.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the optical limiting material for wavelengths of pulsed electromagnetic radiation from a source thereof of the invention may include an acceptor composition having a ground-state absorption cross section, $\sigma_1$, and an excited-state absorption cross section, $\sigma_0$, such that $\sigma_1/\sigma_0 \geq 1$ within a first wavelength interval, and a conjugated polymeric composition in which the acceptor composition is soluble such that the acceptor compound is not covalently bonded to the conjugated polymeric composition, the conjugated polymeric composition having an absorption within a second wavelength interval of pulsed electromagnetic radiation which includes the wavelengths of pulsed radiation, the relaxation time of the acceptor composition being long compared with the optical pulse width of the source of radiation, whereby the conjugated polymeric composition may absorb the wavelengths of pulsed radiation and transfer the energy thereof to the acceptor composition in the wavelength region where the acceptor composition does not absorb the pulsed radiation, and enhance the nonlinear absorption of the pulsed radiation where the first wavelength interval is included within the wavelengths of pulsed radiation.

Benefits and advantages of the invention include the ability to provide effective optical limiting devices having acceptable thickness over selected wavelength ranges.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Briefly, the present invention includes fullerenes modified to have side chains such that the strong nonlinear absorptions of unmodified fullerenes are preserved and enhanced, while solubility in host compositions is improved. The invention further includes semiconducting (conjugated) polymer host materials sensitized with fullerenes, methanofullerenes, fulleroids and/or other suitable acceptors, where the high quantum efficiency and metastability of photoinduced charge transfer allows the large excited-state absorptions of the fullerene guest (and polymer host) to be accessed over a much broader wavelength range than in the pure materials. Such solids have high laser damage threshold (for example, fluence greater than 1 $J/cm^2$), and have sufficiently fast response to limit laser beams comprising short (in time) pulses. Conducting polymers are well known [See, e.g., *Handbook of Conducting Polymers*, ed. T. A. Skotheim (New York, Marcel Dekker, 1986)].

Reference will now be made in detail to the present preferred embodiments of the invention, examples of which are described in the accompanying drawings. Since the criterion for optical limiting requires that the ground-state absorption cross section $\sigma_0$ be small but finite in comparison to the excited-state absorption cross section, $\sigma_0$, pure and substituted $C_{60}$ are not effective optical limiting materials for wavelengths less than 450 nm, because $\sigma_0$ is too large, or for wavelengths greater than 650 nm, because $\sigma_0$ is too small. However, the excited-state absorption cross sections of pure and substituted $C_{60}$ are large over the wavelength range from 650–1100 nm. When $C_{60}$ or $C_{60}$ derivatives are mixed with an absorbing semiconducting polymer, the composite mixture undergoes efficient photoinduced charge-transfer. That is, photo-excited electrons are transferred from the polymer to the fullerene molecule in less than 0.3 picoseconds [See, e.g., N. S. Sariciftci, L. Smilowitz, A. J. Heeger and F. Wudl, *Science*, 258, 1474 (1992) and B. Kraabel, D. McBranch, N. S. Sariciftci, D. Moses, and A. J. Heeger, *Phys. Rev.* B50, 18,543 (1994)]. Since the charge transfer rate is more than 1000 times faster than any competing process, the quantum efficiency for charge separation approaches unity. This provides a mechanism whereby electrons excited in the polymer host by light over a broad and tunable wavelength range are immediately transferred to the fullerene guest, so that the large excited-state absorption cross sections of the fullerene (and the polymer host) may be directly accessed. Thus, nonlinear absorption and optical limiting in solid blends of semiconducting polymers with substituted fullerenes (methanofullerenes and fulleroids) over wavelength ranges which are much broader than for materials containing only the pure and substituted fullerene in a transparent, optically inactive host can be achieved.

To tune the useful spectral range for the optical limiting materials, one can employ conjugated polymers with different energy gaps, the principal condition being that the $\pi$–$\pi^*$ absorption is at higher energy than the spectral range to be used for optical limiting. Generally, polymers with desired energy gaps can be chosen from the list of known semiconducting polymers. Control of the band gap is straightforward, for there exists an understanding founded on quantum chemical calculations and empirical knowledge of how to control the $\pi$–$\pi^*$ gap in conjugated polymers through changes in the molecular structure [see e.g., *Conjugated Polymeric Materials: Opportunities in Electronics, Optoelectrics and Molecular Electronics*, Vol. 82 of NATO Advanced Study Institute, Series E: Applied Sciences, edited by J. L. Bredas and R. R., Kluwer Academic].

Semiconducting polymers which are soluble in common organic solvents are preferred, for such polymers can be readily processed into optical quality thin films by casting from solution. The methods for rendering such polymers soluble are wellknown [See e.g., A. J. Heeger and Paul Smith, "Solution Processing of Conducting Polymers: Opportunities for Science and Technology", in *Conjugated Polymers*, Ed. by J. L. Bredas and R. Silbey (Kluwer Academic Publishers, Dordrecht, 1991)]. Suitable semiconducting polymers include, for example: poly-3-octylthiophene (P3OT), polyacetylene, polypyrrole, polythiophene, poly-3-methylthiophene, polyisothianaphene, poly-3-alkylthiophene, poly-3-alklysulphonate, polyanaline, polyparaphenylene, polyparaphenylene sulphide, polyparaphenylene vinylene, polycarbazole, poly(1,6-heptadiyne), polyquinoline, and mixtures thereof.

Buckminsterfullerene, $C_{60}$, has attracted interest due to its electron acceptor properties upon photoexcitation [See, e.g., N. S. Sariciftci, L. Smilowitz, A. J. Heeger and F. Wudl, *Science*, 258, 1474 (1992), K. Lee, R. Janssen, N. S. Sariciftci, and A. J. Heeger, Phys. Rev. B49, 5781 (1994), N. S. Sariciftci, and A. J. Heeger, Int. J. of Mod. Phys. B, 8 237 (1994), B. Kraabel, C. H. Lee, D. McBranch, D. Moses, N. S. Saricifici and A. J. Heeger, Chem. Phys. Lett. 213, 389 (1993), B. Kraabel, D. McBranch, N. S. Sariciftci, D. Moses, and A. J. Heeger, Phys. Rev. B50, 18,543 (1994), L. Smilowitz, N. S. Sariciftci, R. Wu, C. Gettinger, A. J. Heeger and F. Wudl, Phys. Rev. B47, 13,835 (1993), and C. H. Lee, G. Yu, D. Moses, K. Pakbaz, C. Zhang, N. S. Sariciftci, A. J. Heeger and F. Wudl, Phys. Rev. B48, 15,425 (1993)]. Buckminsterfullerenes can accept as many as six electrons in the lowest unoccupied molecular orbital [See, e.g., P. M. Allemand and F. Wudl, *J. Am. Chem. Soc.* 113, 1050 (1991)]. Because of the tendency for $C_{60}$ to phase separate and crystallize, however, there is only limited solubility of $C_{60}$ in conjugated polymers. To achieve efficient charge separation and a high concentration of metastable excited states following photoexcitation, a series of soluble functionalized $C_{60}$ derivatives has been developed [See J. C. Hummelen, B. W. Knight, F. Lepec, and F. Wudl, J. Org. Chem. 60, 532 (1995)]. Molecular structures of soluble derivatives from the class of methanofullerenes include, for example, the following: (6,6)PCBM (6,6 phenyl-$C_{61}$-butyric acid methyl ester), (6,6)PCBCR (6,6 phenyl-$C_{61}$-butyric acid cholesteryl ester), and mixtures thereof. The class of methanofullerenes is readily expanded by changing the functional group attached to the external methylene carbon. Molecular structures of soluble derivatives from the class of fulleroids include, for example, the following: (5,6)PCBM (5,6 phenyl-$C_{61}$-butyric acid methyl ester), (5,6)PCBCR (5,6 phenyl-$C_{61}$-butyric acid cholesteryl ester), and mixtures thereof. The class of fulleroids is readily expanded by changing the functional group attached to the external methylene carbon. With either of these classes of soluble $C_{60}$-derivatives, one can make homogeneous, stable, optical quality films of semiconducting (conjugated) polymers containing up to or even greater than 1:1 by weight methanofullerenes or fulleroids. Although $C_{60}$ phase separates at high concentrations in mixtures with semiconducting polymers, $C_{60}$ is useful as a constituent in the optical limiter materials.

Other suitable acceptors include any which satisfy the basic conditions of photoinduced charge transfer and charge separation. A basic description of intramolecular and/or intermolecular photoinduced electron transfer has been described as follows [See, e.g., N. S. Sariciftci and A. J. Heeger, U.S. Pat. No. 5,331,183, and N. S. Sariciftci, L. Smilowitz, A. J. Heeger and F. Wudl, *Science*, 258, 1474 (1992)]:

Step 1: $D+A \rightarrow {}^{1,3}D^*+A$, (excitation on D);
Step 2: ${}^{1,3}D^*+A \rightarrow {}^{1,3}(D-A)^*$, (excitation delocalized on D–A complex);
Step 3: ${}^{1,3}(D-A)^* \rightarrow {}^{1,3}(D^{\delta+}-A^{-\delta})^*$, (charge transfer initiated);
Step 4: ${}^{1,3}(D^{\delta+}-A^{\delta-})^* \rightarrow {}^{1,3}(D^{+\cdot}-A^{-\cdot})$, (ion radical pair formed); and
Step 5: ${}^{1,3}(D^{+\cdot}-A^{-\cdot}) \rightarrow D^{+\cdot}+A^{-\cdot}$, (charge separation);

where the donor (D) and acceptor (A) units are either covalently bound (intramolecular) or spatially close, but not covalently bonded (intermolecular), and the numerals 1 and 3 denote singlet or triplet excited states, respectively. At each step, the D–A system can relax back to the ground state either by releasing energy to the "lattice" in the form of heat, or through light emission, provided that the radiative transition is allowed. The electron transfer (step 4) describes the formation of an ion radical pair. This process does not occur unless $I_{D^*}-A_A-U_C<0$, where $I_{D^*}$ is the ionization potential of the excited state ($D^*$) of the donor, $A_A$ is the electron affinity of the acceptor, and $U_C$ is the Coulomb energy of the separated radicals including polarization effects. Stabilization of the charge separation (step 5) can possibly be enabled by carrier delocalization on the $D^+$ (and/or $A^-$) species and by structural relaxation. The electron transfer step (step 4) requires that the lowest unoccupied molecular orbital of the acceptor be within the energy gap of the semiconducting polymer.

Examples of suitable acceptors include, but are not limited to, the following: 1-tetracyano-p-quinodimethane, 2,11, 11,12,12-tetracyanoanthraquinodimethane, 3,13,13,14,14-tetracyano-5,12-naphtacenequinodimethane, 4,8,9-dimethoxy-13,13, 14,14-tetracyano-5,12-naphtacenequinodimethane, 5,15,15,16,16-tetrscyano-5,14-pentacenequinodimethane, 6,15,15,16,16-tetracyano-6,13pentacenequinodimethane, and mixtures thereof.

Typically, solid films can be fabricated by codissolving the semiconducting polymer and the acceptor in a common solvent. Films of the desired thickness are then cast from solution. Films comprising semiconducting polymers sensitized with fullerenes, methanofullerenes, fulleroids and/or other suitable acceptors in stable optical quality host polymers can also be used. Suitable host polymers include polymethyl methacrylate and a variety of amorphous host polymers which are compatible with the semiconducting polymer and the acceptor. Crystalline host polymers scatter light and are therefore less useful for optical limiter applications. When consistent with the physical properties (in particular, the stability at high temperatures) of the constituents (i.e., the semiconducting polymer plus the sensitizing fullerenes, methanofullerenes, fulleroids and/or other suitable acceptors plus any host polymer), the films for use in optical limiter applications can be fabricated and/or applied by melting the mixture.

Having generally described the present invention, the following specific examples are presented to illustrate its teachings.

EXAMPLE 1

This example demonstrates the large, nonlinear absorption in the solid films of semiconducting polymer (P3OT) sensitized with methanofullerene [(6,6) PCBCR]. For comparative studies, solid films were made of (6,6)PCBCR and P3OT, in a 1:1 (by weight) mixture. Each material was dissolved in xylene. Thick films (20–30 µm) for nonlinear optical (NLO) absorption experiments at off-resonant wavelengths were cast from filtered solutions onto fused silica substrates. Thin films (0.1–0.2 µm thick), for measurements near resonance and for third harmonic generation (THG) experiments, were prepared by spin coating. All samples were kept under vacuum (~$10^{-6}$ torr) during experiments to minimize photooxidation. Transmission (T) for wavelengths from 620 nm to 960 nm was measured using a pulsed dye laser pumped by the second harmonic of a Q-switched Nd:YAG laser. The full-width-at-half-maximum of the dye laser pulse was about 8 ns with a repetition rate of 10 Hz. At each wavelength, the dye Laser beam was loosely focused, and the sample was translated along the optical axis (Z-axis) through the focus. The Gaussian beam radius at focus (radius at 1/e of the maximum electric field) was estimated to be ~25 µm. To obtain the nonlinear change in transmission ($\Delta T/T$ vs Z), all the transmitted light was collected by a lens onto a silicon photodiode (open aperture Z-scan). [See, e.g., M. Sheik-Bahae, A. A. Said, T.-H. Wei, D. J. Hagan, and E. W. Van Stryland, IEEE J. of Quantum Elect. 26, 760 (1990)]. Closed aperture Z-scans were also attempted; however, nonlinear refraction was not observed because the nonlinear absorption was dominant.

Z-scan data were fit to a model based on pure two-photon absorption (TPA) assuming Gaussian spatial and temporal laser intensity profiles. [M. Sheik-Bahae et al., supra]. The "effective" TPA coefficient, $\beta_{eff}$ provided a good description of the nonlinear contribution to the absorption coefficient, $\alpha(I) = \alpha_o + \beta_{eff} I$. Values obtained for $\beta_{eff}$ from the fits are summarized in the TABLE.

The $\beta_{eff}$ values were obtained at low input energies where the values are constant within experimental error, and were found to be weakly dependent on the input optical pulse energy, decreasing slightly at higher input pulse energies; a $\beta_{eff} = 140$ cm/MW was obtained in the low input energy regime where the values are constant within the experimental error (760 nm, input energy, 0.2 µJ/pulse, film thickness, 30 µm). At 760 nm, the NLO absorption is enhanced by more than two orders of magnitude in the composite film over that for films of pure P3OT or pure (6,6) PCBCR. This is indeed nonlinear absorption, since thermal effects which might be significant for Z-scan measurements in the nanosecond regime were ruled out by the large enhancement in the blend over the pure P3OT and pure (6,6) PCBCR films. The three films have approximately the same optical density at the wavelengths where the measurements were carried out, and heating would have been the same for the blend and for the pure film. The spectral dependence of $\alpha_{eff}$ for the composite film was compared with $A_0$ of the same thickness film, and the dependence of $\beta_{eff}$ was found to follow the absorption coefficient which decreases with increasing wavelength (in the tail of the π–π* of the π–π* absorption of the P3OT polymer). As seen from the TABLE, nonlinear bleaching was observed at 620 nm. This arises from the shift in oscillator strength from the interband transition characteristic of the ground state to the absorption from the charge transferred excited state [See, B. Kraabel, C. H. Lee, D. McBranch, D. Moses, N. S. Sariciftci and A. J. Heeger, Chem. Phys. Lett. 213, 389 (1993), and B. Kraabel, D. McBranch, N. S. Sariciftci, D. Moses, and A. J. Heeger, Phys. Rev. B50, 18,543 (1994)]. Although 760 nm was found to be below the principal π–π* absorption, there exists a small residual absorption coefficient (~270 cm$^{-1}$), mainly from the P3OT component, which is sufficiently large to initiate the process.

Figure 2:
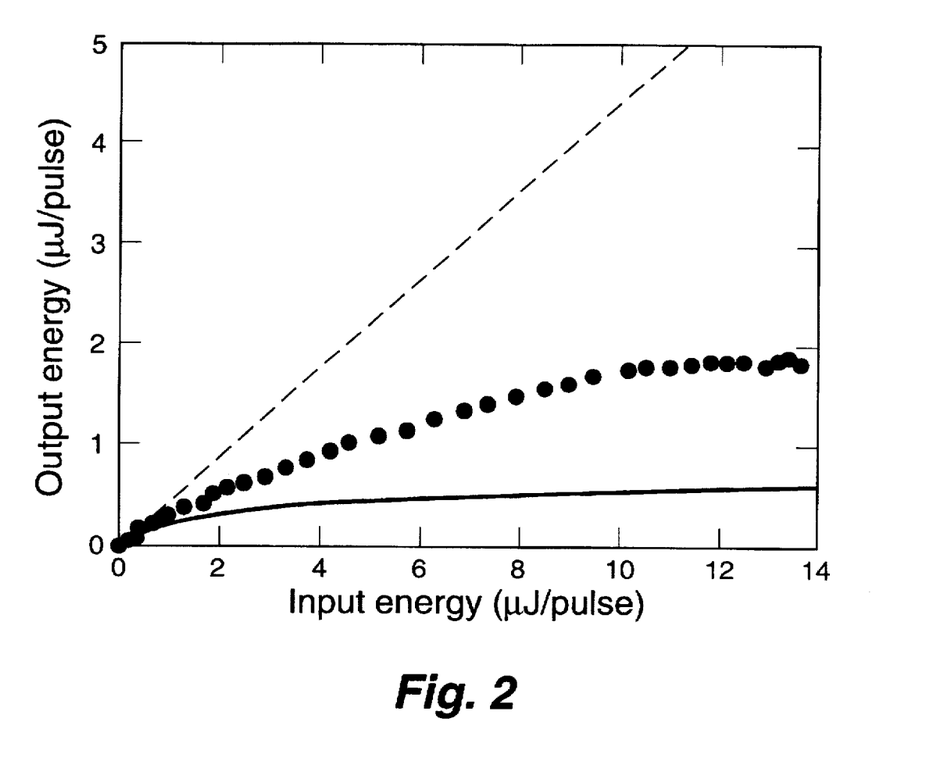
FIG. 2 shows the performance of an optical limiter made from a 1:1 by weight mixture of (6,6) PCBCR and P3OT at 760 nm, the closed circles representing experimental data and the dashed line representing linear transmission (44%).

For 30 µm thick P3OT/(6,6)PCBCR films, there is both a large excited state absorption cross section and a sizable linear transmission (44%) at 760 nm. The photoinduced charge transfer blend film was brought to the focus which had been found from Z-scan measurements, and the input pulse energy was varied by rotating a polarizer between two fixed polarizers. The data are plotted in FIG. 2. The limiting function of the P3OT/[6,6]PCBCR blend was clearly established; at 5 µJ/pulse (~0.6 J/cm² average fluence), the transmission was reduced to half of the linear transmission. Saturation occurred at $E_{out} < 2$ µJ/pulse for higher inputs.

The damage threshold was around 15 µJ/pulse (~1 J/cm²fluence), above which there is a permanent change in the linear transmission.

EXAMPLE 2

This Example illustrates that the ratio of the excited-state absorption cross section to the ground-state absorption cross section is much greater than one in derivatives of $C_{60}$, such as the methanofullerene (6,6) PCBCR, over a wide range of wavelengths and timescales, and further shows that the

TABLE

| Effective two-photon absorption coefficients, $\beta_{eff}$ (cm/MW) for three films. | | | | | | | |
|---|---|---|---|---|---|---|---|
| λ(nm) | 620 | 700 | 760 | 810 | 860 | 910 | 960 |
| P3OT | (—) | 5.6 ± 1 | 0.76 ± 0.1 | 1.3 ± 0.1 | 0.8 ± 0.2 | 0.6 ± 0.3 | <0.3 |
| (6,6)PCBCR | no data | <60* | 0.6 ± 0.1 | 0.3 ± 0.2 | <0.2 | <0.3 | <0.3 |
| Composite | (—) | 220 ± 30 | 140 ± 16 | 44 ± 4 | 17 ± 2 | 5.3 ± 0.5 | 1.6 ± 0.2 |

(—) negative value (bleaching)
* intensity-dependent enhanced solubility of the substituted fullerene is required for practical limiting in solutions, blends, or thin films less than 0.2 cm in length.

Optical limiting due to reverse saturable absorption (RSA) requires that the ratio of the excited-state absorption cross section to the ground-state absorption cross section be greater than one, preferably over a wide range of wavelengths and timescales. The limiting effectiveness of a RSA material scales directly with the magnitude of this ratio; the larger this ratio, the lower the transmitted fluence in the high incident fluence limit To establish that this condition is satisfied in suitably substituted derivatives of $C_{60}$ picosecond transient absorption experiments were undertaken to directly measure the excited-state absorption cross section over the wavelength range of interest in the substituted fullerenes (methanofullerenes, fulleroids, etc.) as well as in pure $C_{60}$ in toluene solution. The experimental geometry has been described in detail previously [See, e.g., B. Kraabel, D. McBranch, N. S. Sariciftci, D. Moses, and A. J. Heeger, Phys. Rev. B50, 18,543 (1994)]. In these experiments, 0.2 ps pulses of light at the excitation wavelength of 397 nm (3.12 eV) excite a portion of the electrons in the material into the excited state. A time-delayed probe pulse extending from 1.13–2.6 eV (1100–475 nm) then samples the change in absorption due to the excited-state population, relative to the ground-state absorption.

Figure 3:
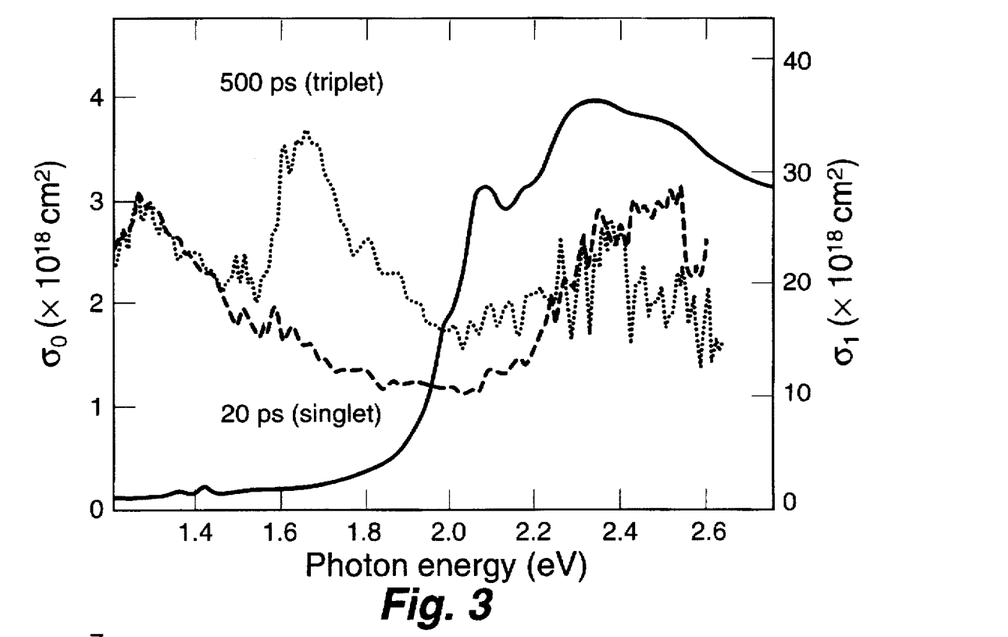
FIG. 3 shows the ground-state absorption cross section (solid line, left axis) and excited-state cross section (right axis) for $C_{60}$ dissolved in toluene at short times (20 ps, dashed line) and at longer times (500 ps, dotted line).
Figure 4:
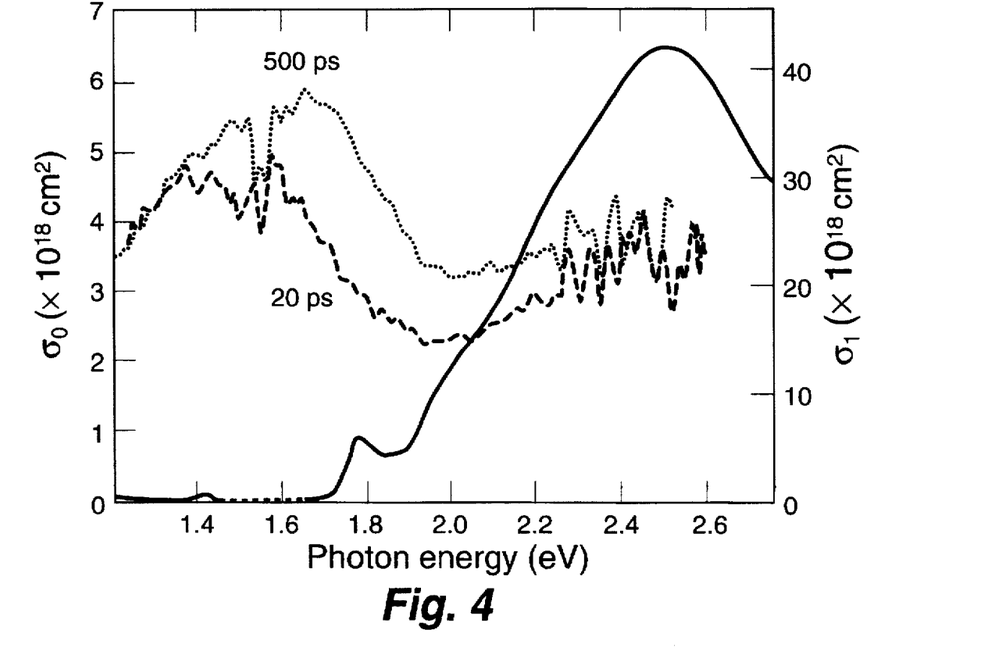
FIG. 4 shows the ground-state absorption cross section (solid line, left axis) and excited-state cross section (right axis) for (6,6) PCBCR methanofullerene dissolved in toluene at short times (20 ps, dashed line) and at longer times (500 ps, dotted line).

Results for $C_{60}$, and (6,6) PCBCR are shown in FIGS. 3 and 4, respectively. Comparisons are made of the ground-state absorption cross section $\sigma_0$ (solid line, left axis) with the effective excited-state absorption cross section $\sigma_1$(right axis) versus photon energy at two times: 20 ps (dashed line), and 500 ps (dotted line). It is apparent that, despite substantial changes in the shape and magnitude of the ground-state absorption cross section as a function of photon energy in the substituted methanofullerene, the criterion for efficient optical limiting is satisfied over a broad range of wavelengths. More importantly, the optical limiting effectiveness is actually increased for (6,6) PCBCR in the energy range from 1.7–2.2 eV (730–560 nm), since for light of these energies $\sigma_0$ in (6,6) PCBCR is smaller than $\sigma_0$ in $C_{60}$, while $\sigma_1$ in (6,6) PCBCR is larger than $\sigma_1$ in $C_{60}$. Hence the ratio $\sigma_1/\sigma_0$ is greater for (6,6) PCBCR than for $C_{60}$ in this energy range.

The requirement that $\sigma_0$ must be finite can be related to an additional criterion for the effectiveness of the limiting in solution or a molecularly dispersed solid blend, based on the known solubility of the materials. A minimum of approximately 30% of the light must be absorbed at low fluence in order to activate the excited-state absorption [L. W. Tutt and T. F. Boggess, Prog. Quant. Elect. 17, 299 (1993)]. Consequently, for a given sample length L there is a minimum $\sigma_0$, denoted by $\sigma_{min}$, required at the maximum achievable concentration $\eta_{max}$ to achieve this 30% absorption. The expression for $\sigma_{min}$ is $\sigma_{min}=0.35/(\eta_{max}*L)$. For $C_{60}$ in toluene, $\eta_{max}=1.0\times10^{18}$ cm$^{-3}$; for(6,6)PCBCR in toluene, $\eta_{max}=1.0\times10^{19}$ cm$^{-3}$. Hence, using a sample length L of 0.2 cm, for $C_{60}$, $\sigma_{min}=1.8\times10^{-18}$ cm$^2$; for(6,6)PCBCR, $\sigma_{min}=1.8\times10^{-19}$ cm$^2$. From FIGS. 3 and 4, it is apparent that for photon energies below 2.0 eV (wavelengths longer than 620 nm) $C_{60}$ will not be an effective limiting material, whereas (6,6) PCBCR will be an effective limiting material over the entire range from 1.7–2.5 eV (730–475 nm).

EXAMPLE 3

This Example illustrates efficient optical limiting at a wavelength of 575 nm, and that the information obtained by time-resolved excited-state absorption measurements can be accurately used to predict optical limiting performance.

Figure 5:
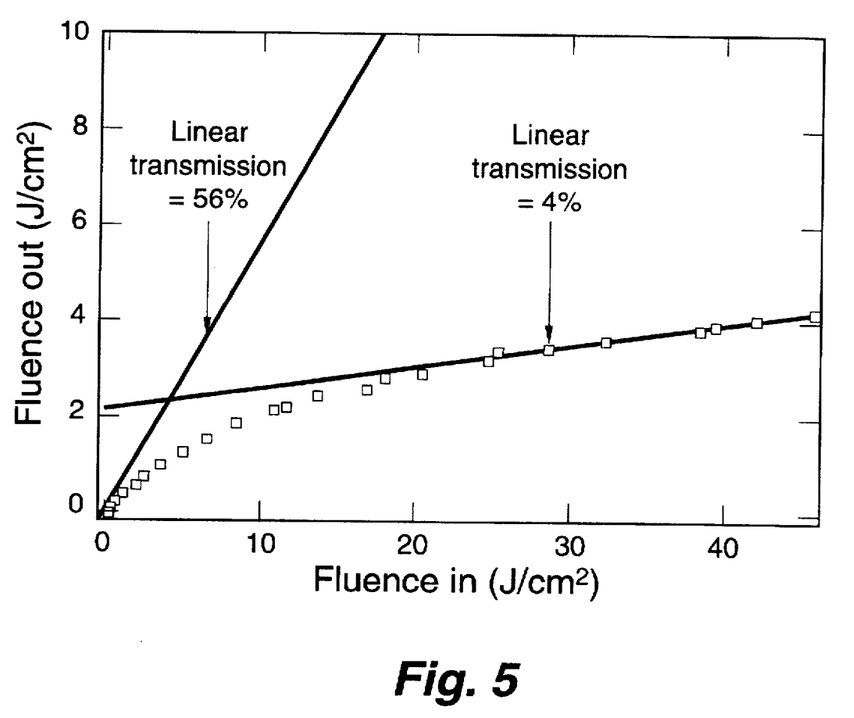
FIG. 5 shows the optical limiting performance of (6,6) PCBCR dissolved in toluene at 575 nm.

Optical limiting was demonstrated in solutions of the methanofullerene (6,6) PCBCR in toluene. The concentration was adjusted so that the linear transmission of the 0.2 cm length sample was 56%. The transmitted fluence was measured as a function of the incident fluence for 8 ns pulses of light at 575 nm. up to an incident fluence of 40 J/cm$^2$. The data are plotted in FIG. 5. The limiting function of this molecule in solution at 575 nm is clearly established. The slopes of the two solid lines in FIG. 5 correspond to the linear transmittance of the sample in the low fluence, and high fluence limits, respectively. The low fluence (linear) transmission is 56%. The high fluence transmission is 4%. The ratio of the excited-state absorption cross section to the ground-state absorption cross section obtained from this measurement is $\sigma_1/\sigma_0=6.7$. This compares favorably with the ratio obtained directly from the time-resolved excited-state absorption measurements described in Example 2. At 575 nm, $\sigma_1/\sigma_0=6.6$ is obtained from the excited-state absorption measurement at 500 ps time delay in (6,6) PCBCR.

EXAMPLE 4

The (5,6) PCBCR and (6,6) PCBCR compounds, having solubilities greater than ten times that of the pure $C_{60}$ in common organic solvents, are synthesized as follows (four synthetic steps):

A. 4-Benzoylbutyric acid cholesteryl ester:

A mixture of cholesterol (6.0 g; 15.5 mmol), 4-benzoylbutyric acid (4.5 g; 1.5 equivalent), p-toluenesulfonic acid (150 mg), and 150 mL toluene was stirred and refluxed using a Dean-Stark trap for 18 hours. The solvent was removed in vacuo and the residue was chromatographed over a silica gel column using $CH_2C_{12}$ as the eluent. After a rapidly eluted minor component, the fraction containing the ester was collected. Following evaporation of the solvent, the ester was obtained as a white solid (4.7 g; 54%). Crystallization from $Et_2O$ afforded analytically pure material; mp 133.5°–134.5° C.

B. 4-Benzoylbutyric acid cholesteryl ester tosyl hydrazone:

A mixture of ketoester (7.25 g, 12.9 mmol), tosyl hydrazide (3.61 g, 1.5 equivalent), 245 mg p-toluenesulfonic acid, and 300 mL toluene was stirred and refluxed using a Dean-Stark trap for 18 hours. After cooling, the solution was shaken with $H_2O(2\times200$ mL), dried with $MgSO_4$, filtered, and concentrated in vacuo. The product mixture of (E)-and (Z)-isomers was crystallized from $CH_2C_{12}$/MeOH. The crystalline material was dried at ambient temperature in vacuo overnight. Yield: 8.09 g (86%); mp. 96°–148° C.

C. (5,6) 1-Phenyl, 1-{3-hydroxycarbonylpropyl}-$C_{61}$-cholesteryl ester:

Dry pyridine (30 mL) was introduced in a dry 250 mL three-necked flask under an atmosphere of N2. Tosyl hydrazone (2.92 g; 4 mmol) was added with stirring. To the clear solution, MeONa (240 mg; 4.4 mmol) was added and the mixture was stirred during 30 minutes to yield a yellowish suspension. A solution of $C_{60}$ (1.44 g, 2 mmol) in 100 mL 1,2-dichlorobenzene was added at once and the resulting mixture was stirred to 70°–80° C. during 72 hours. The volatile components were removed in vacuo at 80° C. and the residue was washed with MeOH (3×100 mL). Any suspended product was recovered by centrifuging. The solid mixture was dissolved in 100 mL $CS_2$, to this solution was added 40 mL toluene/cyclohexane 1:2, and this solution was poured on a silica gel column and eluted with toluene/cyclohexane 1:2. After the fraction containing unreacted $C_{60}$ was obtained, the column was eluted with toluene/cycohexane 1:1 to yield the purple fraction containing the (5,6) monoadduct. The fractions were concentrated in vacuo. Buckminsterfullerene was dissolved in a minimum amount of $CS_2$, precipitated with $Et_2O$, washed with 3×100 mL $Et_2O$ using the centrifuge method, and dried overnight in vacuo at 50° C. during 48 hours. Yield: 1.030 g (41%); mp>300° C.

D. (6,6) 1-Phenyl, 1-{3-hydroxycarbonylpropyl}-$C_{61}$-cholesteryl ester:

A purple solution of the (5,6) monoadduct (500 mg) in 500 ml toluene in a Pyrex flask was stirred and purged with $N_2$ while irradiated with an external tungsten lamp during 4 hours. The temperature of the solution was maintained below 50° C. using an ice-bath. The resulting brown solution was concentrated in vacuo to 20 mL and transferred to a centrifuge bottle. The product was precipitated with 80 mL MeOH, the suspension was centrifuged, and the resulting clear supernatant was decanted. The residue was washed with 3×80 mL MeOH using the centrifuge method and dried in vacuo overnight at 60° C. Yield: 497mg (99%); mp 270°–275° C.

The foregoing description of the invention has been presented for purposes of illustration and description and is not intended to be exhaustive or to limit the invention to the precise form disclosed, and obviously many modifications and variations are possible in light of the above teaching. For example, it would be apparent to one having ordinary skill in the art of optical limiting materials, after having carefully studied the present disclosure, that energy transfer mechanisms other than charge transfer might be employed to transfer energy from an absorbing host material to an optical limiting species dissolved therein. Moreover, the broadening of the optical limiting properties of substituted fullerenes to beyond their spectra absorption range by selecting suitable host materials such as conjugated polymers should be generalizable to other optical limiting compositions.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical limiting material for wavelengths of pulsed electromagnetic radiation from a source thereof, which comprises an acceptor composition having a ground-state absorption cross section, $\sigma_0$, and an excited-state absorption cross section, $\sigma_1$, such that $\sigma_1/\sigma_0 \geq 1$ within a first wavelength interval, and a conjugated polymeric composition in which the acceptor composition is soluble such that said acceptor composition is not covalently bonded to said conjugated polymeric composition, said conjugated polymeric composition having an absorption within a second wavelength interval of pulsed electromagnetic radiation which includes the wavelengths of pulsed radiation, the relaxation time of said acceptor composition being long compared with the optical pulse width of the source of radiation, whereby said conjugated polymeric composition absorbs the wavelengths of pulsed radiation and transfer the energy thereof to said acceptor composition in the wavelength region where said acceptor composition does not absorb the pulsed radiation, and enhance the nonlinear absorption of the pulsed radiation where the first wavelength interval is included within the wavelengths of pulsed radiation such that said optical absorbing material limits the wavelengths of pulsed radiation directed therethrough.

2. The optical limiting material as described in claim 1, wherein the energy transfer occurs by an electron transfer mechanism.

3. The optical limiting material as described in claim 1, wherein said acceptor composition is selected from the group consisting of fullerenes, methanofullerenes, fulleroids, and mixtures thereof.

4. The optical limiting material as described in claim 3, wherein said methanofullerenes are selected from the group consisting of (6,6) PCBM, (6,6) PCBCR, and mixtures thereof.

5. The optical limiting material as described in claim 3, wherein said fulleroids are selected from the group consisting of (5,6) PCBM, (5,6) PCBCR, and mixtures thereof.

6. The optical limiting material as described in claim 1, wherein said acceptor compositions are selected from the group consisting of 1-tetracyano-p-quinodimethane, 2,11,11,12,12-tetracyanoanthraquinodimethane, 3,13,13,14,14-tetracyano-5,12naphtacenequinodimethane, 4,8,9-dimethoxy-13,13,14,14-tetracyano-5,12naphtacenequinodimethane, 5,15,15,16,16-tetracyano-5,14-pentacenequinodimethane, 6,15,15,16,16-tetracyano-6,13-pentacenequinodimethane, and mixtures thereof.

7. The optical limiting material as described in claim 1, wherein said polymeric composition is selected from the group consisting of poly-3-octylthiophene, polyacetylene, polypyrrole, polythiophene, poly-3-methylthiophene, polyisothianaphene, poly-3-alkylthiophene, poly-3-alkylsulphonate, polyanaline, polvparaphenylene, polyparaphenylene sulphide, polyparaphenylene vinylene, polycarbazole, poly(1,6-heptadiyne), polyquinoline, and mixtures thereof.

\* \* \* \* \*